April 14, 1959     R. J. KUTZLER     2,881,990
AUTOMATIC PILOT FOR AIRCRAFT
Filed May 6, 1953     2 Sheets-Sheet 2

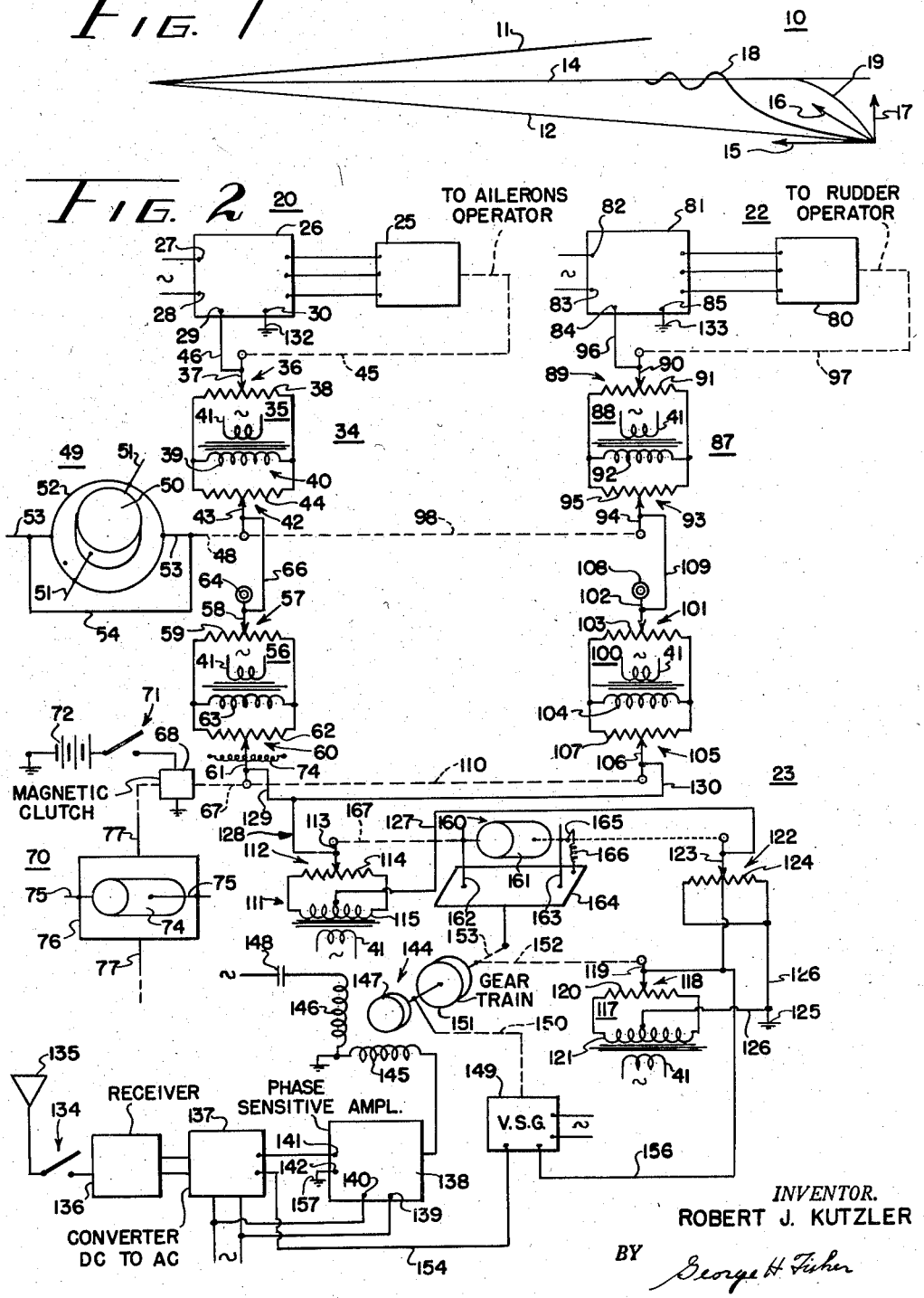

INVENTOR.
ROBERT J. KUTZLER
BY George H. Fisher
ATTORNEY

United States Patent Office
2,881,990
Patented Apr. 14, 1959

2,881,990

AUTOMATIC PILOT FOR AIRCRAFT

Robert J. Kutzler, St. Louis Park, Minn., assignor to Minneapolis-Honeywell Regulator Company, Minneapolis, Minn., a corporation of Delaware Application May 6, 1953, Serial No. 353,375

15 Claims. (Cl. 244—77)

The present invention relates to automatic flight control apparatus for an aircraft, and it particularly relates to such control apparatus which is responsive to radio signals received from a remote radio station generally located at a landing station for the aircraft.

The radio signals detected by the apparatus on the craft have a magnitude proportional to the lateral displacement of the aircraft from a constant potential line or localizer beam and have a phase or polarity corresponding to the side of the constant potential line on which the aircraft is positioned. The apparatus is responsive to such lateral displacement signals and automatically corrects the course of the craft to align the aircraft flight path with the constant potential line or beam.

Lateral displacement signals alone however do not effect correction of the craft course without resulting in oscillations or "hunting" of the craft flight path across the line as the craft flight generally proceeds along the direction of the constant potential line. The invention as provided includes novel means that supplements the lateral displacement control signals to minimize the oscillations or "hunting" of the craft across the beam.

An object of this invention therefore is to supplement the craft lateral displacement control effected by displacement signals for automatically controlling the course of a craft by novel means responsive to the rate of change of craft lateral displacement from the radio beam defined course.

A further object of this invention is to modify the lateral displacement control which automatically corrects for departure of the craft flight path from a radio beam defined course in accordance with the rate of change of lateral displacement of the craft from the course.

A further object of this invention is to supplement and correct the control signals proportional to the lateral displacement of a craft from a radio defined beam in accordance with the rate of change of the lateral displacement.

A further object of this invention is to modify and supplement in accordance with the rate of lateral displacement of a craft from a radio defined beam the automatic control of craft course.

The above and further objects of the invention will be evident from a consideration of the following detailed description thereof taken in connection with the accompanying drawings illustrating a preferred embodiment thereof.

In the drawings:

Figure 1 is a diagram of a radio beam defined course along with three selected possible positions of an aircraft relative to the course.

Figure 2 is a schematic arrangement of the flight control apparatus for automatically correcting departures of the craft from the radio defined beam.

Figure 3:
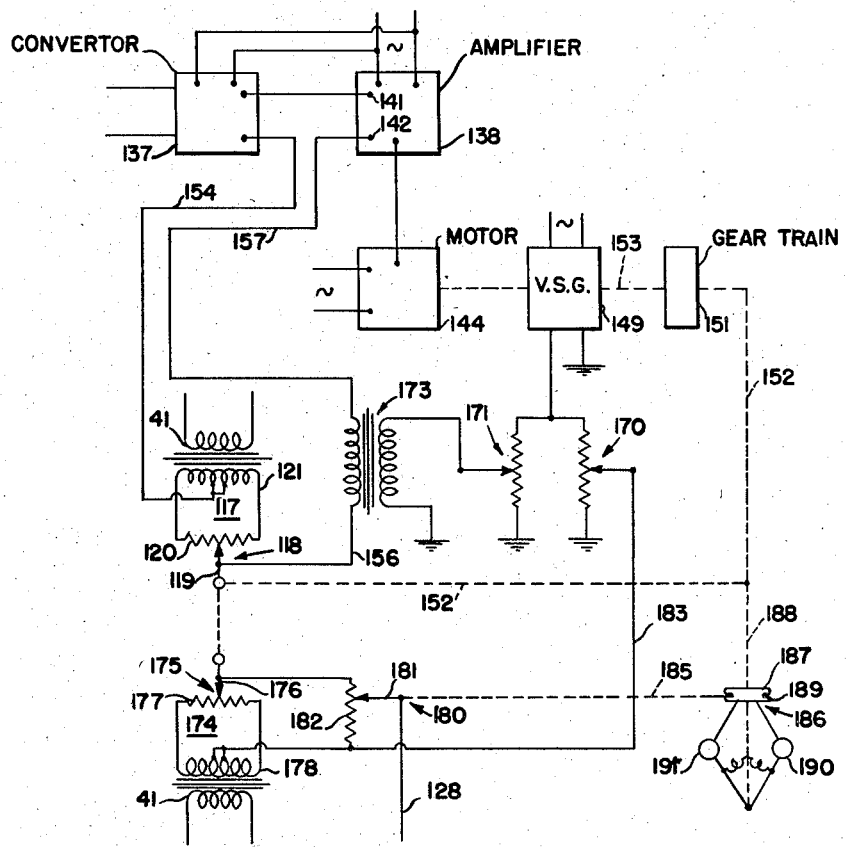
Figure 3 is a modification of a portion of the apparatus of Figure 2 for providing lateral displacement rate signals and reduced lateral displacement signals.

Referring to Figure 1, a localizer pattern 10 defined by radio signals emitted from a ground station has limits or sides 11 and 12 angularly spaced from a ground path 14 and is used to control the heading of the craft upon approaching a landing station. The sides 11 and 12 are approximately spaced 5° from the line 14 defining a course set up by the positional radio signals. Vectors 15, 16 and 17 represent selected directions of movement of several aircraft with respect to the course or beam 14. Vector 15 is parallel to the beam 14, and it is evident that in order to cause the craft to follow the beam a signal proportional to the lateral displacement of the craft from the beam may be utilized to turn the craft initially toward the right to align its heading with the beam 14. Vector 16 represents a plane having a flight path at an angle to the beam 14 but approaching it. In this situation the craft has both a lateral displacement and a lateral displacement rate with respect to the beam 14. It has been heretofore known that altering the heading of a craft to align it with the beam 14 when the craft initially has a heading such as indicated by vector 16 is accomplished with the least amount of hunting of the craft heading about the beam 14 by utilizing lateral displacement and lateral displacement rate signals. The flight path 18 represents very generally the flight path of a plane which has its heading altered to align it with the beam 14 when merely displacement signals are utilized to change heading. On the other hand the path 19 wherein hunting is absent represents the change in heading of a craft laterally displaced from the beam when both lateral displacement and lateral displacement rate signals are utilized. A comparison of the two flight paths indicates that by utilizing rate signals, oscillations of the craft about the beam 14 are eliminated or reduced.

When the craft is approaching the beam along the path of vector 16, it is apparent that the lateral displacement signal causes the craft to change heading toward the right so that the flight path angle with respect to the beam 14 increases. On the other hand the displacement rate signal, since the lateral displacement is decreasing, is of the opposite phase from the lateral displacement signal and has a tendency to cause the craft to turn toward the left or parallel with the beam. In a situation where the craft flight path initially is along the vector 17, it is evident that a maximum rate signal which effects a turn to the left is desired but a minimum lateral displacement signal which effects a turn to the right is desired since the vector is substantially perpendicular to the beam 14. By means of the present invention, a lateral displacement rate signal is provided to assist in aligning the craft heading with the beam 14; however, the lateral displacement control signal is made dependent upon the lateral displacement rate and is reduced in accordance with the lateral rate. Thus in the situation where the craft has its course along vector 17 where the maximum rate of change of displacement is attained, the lateral displacement signal is modified or reduced in accordance with this lateral displacement rate so that the course of the craft is altered along a substantially left turn as directed by the rate signal. Further modification of the displacement signal as the craft approaches the beam 14 is subsequently effected.

In Figure 2, the heading control mechanism for aligning the craft with the beam 14 of Figure 1 comprises an aileron channel 20 and a rudder channel 22. These two channels of the automatic pilot are controlled from a radio beam responsive localizer control arrangement 23 including a source of rate signals and a source of displacement signals, the latter signals being modified by the lateral displacement rate of the craft.

The aileron channel 20 includes a servomotor 25 for positioning the ailerons (not shown) of the aircraft. The servomotor is of the reversible direct current type having a pair of brake windings and a pair of clutch windings. The energization of the clutch windings is controlled by a phase sensitive alternating voltage discriminator amplifier 26. The amplifier comprises a pair of alternating voltage power input terminals 27, 28 connected to a supply of alternating voltage and alternating voltage signal input terminals 29 and 30 connected to a balanceable alternating voltage network 34. Depending upon the instantaneous phase relationship of the signal voltage across terminals 29, 30 with respect to the power voltage across terminals 27, 28 one or the other of a pair of amplifier relays will be energized to energize one or the other of the clutch windings in servomotor 25 enabling it to overcome its corresponding brake winding to effect rotation of the servomotor 25. The servomotor-amplifier combination may be similar to that disclosed in Patent No. 2,425,733 to Willis H. Gille et al.

The balanceable network 34 comprises a follow-up roll attitude signal generator 35 and a trim-heading stabilizing signal generator 56. Signal generator 35 comprises a follow-up potentiometer 36 having a slider 37 and resistor 38, a secondary winding 39 of a transformer 40 having a primary winding 41, and a roll attitude potentiometer 42 having a slider 43 and resistor 44. The resistors 38 and 44 are connected in parallel across the secondary winding 39 to form a Wheatstone bridge with sliders 37 and 43 constituting the output members. Slider 37 is positioned along resistor 38 by a suitable operating connection 45 extending from the servomotor 25. A conductor 46 connects amplifier terminal 29 with slider 37. Slider 43 is positioned along resistor 44 through a suitable operating connection 48 extending therefrom to a trunnion 53 of a vertical gyroscope 49. The gyroscope 49 is of a conventional type having a rotor mounted in a casing 50 for rotation about a vertical spin axis. The casing 50 is carried by trunnions 51, in an outer gimbal ring 52. The gimbal ring 52 in turn is carried by trunnions 53 on a horizontal axis at right angles to the axis of trunnions 51, 51 in a suitable support 54. The amount of rotation of trunnion 53 communicated to slider 43 varies with the magnitude and direction of the bank angle of the aircraft as sensed by the gyroscope 49.

Signal generator 56 comprises a trim potentiometer 57 having a slider 58 and resistor 59, a heading control potentiometer 60 having a slider 61 and resistor 62, and a secondary winding 63 of the transformer 40 since in the arrangement the transformer 40 while having a single primary winding has a plurality of secondary windings. The resistors 59 and 62 are connected in parallel across the secondary winding 63 to form a Wheatstone bridge with sliders 58 and 61 comprising the output members thereof. Slider 58 has secured thereto a manually operable knob 64 for effecting its operation. A conductor 66 connects slider 58 with slider 43 in generator 35. Slider 61 is positioned along resistor 62 from the electrical center thereof by suitable operating means comprising an operating member 67 and a magnetic clutch 68 which connect slider 61 with an upper trunnion 77 of a directional gyroscope 70. The magnetic clutch is energized through a single pole single throw switch 71 from battery 72. The directional gyroscope 70 is of the conventional type having a casing 74 with lateral extending trunnions 75, 75 supporting it for rotation about a horizontal axis in an outer gimbal ring 76. The casing 74 houses a rotor (not shown) for rotation about a horizontal spin axis at right angles to the axis of trunnions 75, 75. The outer gimbal ring 76 includes vertically arranged trunnions 77, 77 suitably mounted in the craft with the upper trunnion driving into magnetic clutch 68. When the magnetic clutch is deenergized by opening switch 71, the slider 61 is operatively disconnected from the gyroscope 70 and spring element 74 connected between the slider 61 and a part of the craft returns the slider to its electrical center on resistor 62. The slider 61 is positioned along resistor 62 from the gyroscope 70 in accordance with the change in heading of the craft from a heading to be stabilized as defined by the rotor spin axis direction.

The rudder channel 22 comprises a rudder servomotor 80 and a rudder servomotor amplifier 81. The rudder servomotor-rudder amplifier combination is similar to that used in the aileron channel 20. The rudder servomotor amplifier 81 comprises power input terminals 82, 83 connected to the supply of alternating voltage and signal input terminals 84, 85 connected to a balanceable alternating voltage network 87. Network 87 comprises a follow-up-roll attitude signal voltage generator 88 and a trim-heading stabilizing signal voltage generator 100. Signal generator 88 comprises a rebalancing potentiometer 89 having a slider 90 and resistor 91, a secondary winding 92 of the transformer 40, and a roll attitude potentiometer 93 having a slider 94 and resistor 95. The resistors 91 and 95 are connected in parallel across the secondary winding 92. Slider 90 is positioned along resistor 91 by a suitable operating connection 97 extending thereto from rudder servomotor 80. A conductor 96 connects amplifier terminal 84 with slider 90. Slider 94 is positioned along resistor 95 from the electrical center thereof by a suitable operating connection 98 connecting slider 94 with the slider operating member 48. Signal generator 100 comprises a trim potentiometer 101 having a slider 102 and resistor 103, a secondary winding 104 of the transformer 40 and a heading stabilizing potentiometer 105 having a slider 106 and resistor 107. Resistors 103 and 107 are connected in parallel across the secondary winding 104 to comprise a Wheatstone bridge similar to the arrangement in signal generator 88 with sliders 102 and 106 representing the output members. Slider 102 has a manually operable knob 108 affixed thereto. A conductor 109 connects slider 102 with slider 94 in signal generator 88. Slider 106 is positioned along resistor 107 by a suitable operating connection 110 extending therefrom to the slider operator 67.

The localizer signal generator 23 with which the invention is immediately concerned comprises a craft lateral displacement rate signal generator 111, a craft lateral displacement signal generator 117, and a lateral displacement signal modifying voltage dividing potentiometer 122. The signal generator 111 comprises a lateral rate potentiometer 112 having a slider 113 and a resistor 114 which is connected across a secondary winding 115 of the transformer 40. A conductor 128 has one end affixed to slider 113 and its opposite end connected to two conductors 129 and 130 extending respectively to sliders 61 and 106. The lateral displacement signal generator 117 comprises a potentiometer 118 having a slider 119 and resistor 120. Resistor 120 is connected across the ends of secondary winding 121 of the transformer. Slider 119 is positioned along resistor 118 in accordance with lateral displacement of the craft from beam 14 by means to be described. The modifying voltage dividing potentiometer 122 comprises a slider 123 and resistor 124. The opposite ends of resistor 124 are connected together and the terminal thus formed by these resistors is connected to a center tap of secondary winding 121 by a conductor 126. A ground conductor 125 extends from the center tap of secondary winding 121. Slider 123 is positioned along resistor 124 in accordance with the rate of change of lateral displacement of the craft relative to beam 14. A conductor 127 connects slider 123 to a center tap of secondary winding 115. It will be evident that the ground conductor 125 and conductor 128 constitute output members of the signal generator 111 and the signal generator 117 as modified by potentiometer 122. The balanceable control circuit for aileron servomotor amplifier 26 is completed through a ground connection 132 connected to amplifier terminal 30 and the balanceable control circuit for rudder servomotor amplifier 81 is completed through a ground conductor 133 connected to amplifier terminal 85.

The localizer or signal generator 23 includes an antenna 135 and radio receiver 136 which are conventionally tuned to the radio signals emitted by the transmitter at the landing station. The receiver 136 supplies to a voltage converter 137 a unidirectional voltage proportional to the lateral displacement of the aircraft on which the receiver 136 is mounted with respect to the beam 14. The converter 137 transforms the unidirectional voltage to an alternating control voltage. The converter 137 herein may be similar to converter 14 of Patent 2,769,950 dated November 6, 1956 wherein a D.C. signal on a conductor 13 is converted to an A.C. signal which appears across secondary winding 57 of transformer 16 therein. The alternating voltage output of the converter 137 is applied to a phase sensitive amplifier 138. The amplifier 138 energizes one winding of a capacitor type induction motor 144. The motor 144 operates the lateral displacement potentiometer 118 and a velocity signal generator 149 so that the extent of operation of motor 144 is proportional to the magnitude of the alternating voltage lateral displacement signal from converter 137. The amplifier 138 comprises signal input terminals 141 and 142 and power input terminals 139, 140 connected to the source of alternating voltage. The output of amplifier 138 is applied to motor winding 145. The other motor winding 146 is connected to the alternating voltage source through a tuning condenser 148. The direction of rotation of rotor 147 of motor 144 depends upon the instantaneous phase relationship between the power voltage across terminals 139, 140 with respect to the control voltage across terminals 141, 142. The rate at which the rotor 147 rotates depends upon the magnitude of the input control signal across terminals 141, 142. The velocity signal generator 149 is coupled to the rotor shaft through a suitable operating connection 150. The output of the velocity signal generator 149 serves to damp the rotation of motor 144 to prevent overshoot thereof. The slider 119 is positioned along resistor 120 of the displacement potentiometer 118 through a suitable operating member 152 extending therefrom to output shaft 153 of a gear train 151 which is driven from the rotor 147. The control circuit for amplifier 138 is of the series summing type and extends from amplifier terminal 141, converter 137, conductor 154, velocity signal generator 149, conductor 156, follow-up motor displacement or displacement feedback signal generator 117, conductor 126, ground conductor 125, and to ground conductor 157 connected to amplifier terminal 142.

From the above, the speed of control motor 144 varies with the error signal on amplifier 138 which is proportional to the ILS or lateral displacement signal minus the feedback signal from potentiometer 118. The energization of winding 145 of motor 144 is such that it is well within the speed modulation energization range.

When the ILS signal from receiver 136 changes, the feedback signal from generator 117 changes at approximately the same rate. If there were a difference in the rates of change of these voltages, the motor 144 would speed up to make the two rates of change of voltage the same. Thus the feedback voltage is made to vary at the same rate as the lateral displacement voltage. Since the feedback voltage is operated from the motor 144 its rate of change is proportional to the motor speed. The motor speed therefore is proportional to the rate of change of the lateral displacement signal supplied by receiver 136.

The output shaft 153 of gear train 151 rotates a platform 164 about a vertical axis. Mounted on the platform 164 is a rate of turn gyroscope 160 comprising a casing 161 having mounted therein a rotor for rotation about a conventionally horizontal spin axis. The casing 161 is carried about a horizontal axis at right angles to the spin axis in support members 162, 163 upstanding from the platform 164. Extending from the cross axis is a lateral arm 165 which has a spring 166 affixed thereto and connected to the platform 164. The restraining spring 166 upon rotation of platform 164 limits the precession of the gyroscope about the cross axis proportional to the rate of turn of platform 164 and thus in proportion to the rate of operation of motor 144. This we have seen is proportional to the rate of change of the lateral displacement signal so that gyroscope 161 precesses about the cross horizontal axis in accordance with the rate of change of the lateral displacement signal. The gyroscope 160 through a suitable operating connection 167 extending from its cross horizontal axis operates the slider 113 of potentiometer 112 and the slider 123 of modifying potentiometer 122.

As the rate of rotation of motor 144 increases slider 113 will be displaced farther from the center of resistor 114, and therefore the velocity or lateral displacement rate signal will increase. On the other hand, as the motor speed increases slider 123 will be moved toward either one or the other end of resistor 124 depending upon which direction the displacement rate is changing and will modify the amount of signal available from lateral displacement signal generator 117 and will modify or reduce the amount of lateral displacement voltage derived from signal generator 117 which appears across the output members 125 and 123 of the lateral displacement signal generator voltage dividing potentiometer combination.

Having described the details of the apparatus, its operation will be considered. With the single pole single throw switch 134 in open position, the amplifier 138 will be controlled by any signal from voltage generator 117 to rotate the motor 144 to center slider 119 on resistor 120. With the termination of operation of motor 144, the slider 113 of the lateral displacement rate generator 111 also will be centered on resistor 114. The single pole switch 71 may be closed to energize magnetic clutch 68 thereby operatively connecting gyro 70 with sliders 61 and 106.

Upon changes in heading of the craft from the heading to be stabilized, the gyroscope 70 will detect such changes in heading and operate sliders 61 and 106 to unbalance the networks 34 and 87. The unbalance of these networks causes operation of their respective amplifiers 26 and 81 which in turn effect rotation of their servomotors 25 and 80 to position the ailerons and rudder. The networks are balanced by operation of the follow-up potentiometer sliders 37 and 90. The ailerons and rudder are thus operated to return the craft to the stabilized heading.

When the craft is to be automatically controlled from the radio signals from the ground station, the single pole switch 71 is moved to open position permitting the spring 74 to center sliders 61 and 106 and render the gyroscope 70 ineffective to position these sliders. The single pole switch 134 is moved to closed position. Signals proportional to the lateral displacement of the craft from the beam 14 are detected by antenna 135 and receiver 136 and these signals are applied to converter 137. The unidirectional voltage input signal to converter 137 is changed to alternating voltage having a frequency corresponding to the frequency of the supply and varies in magnitude and phase in accordance with the magnitude and polarity of the unidirectional input signal from the receiver 136. This alternating lateral displacement signal is applied to amplifier 138 which controls winding 145 of motor 144 effecting the rotation of the motor. This rotation is applied to the lateral displacement follow-up potentiometer 118 and the velocity signal generator 149 so that the slider 119 is positioned in accordance with the magnitude of the lateral displacement signal and in a direction corresponding with the direction of the craft from the beam 14.

The motor 144 rotates the platform 164 to cause precession of gyroscope 160 which is reflected in the displacement of slider 113 in accordance with the rate of change of lateral displacement of the craft. The gyroscope 160 also positions slider 123 to modify the lateral displacement voltage from signal generator 117 applied to networks 34 and 87. Inasmuch as the proportion of the lateral displacement voltage supplied by generator 117 and utilized in the networks 34 and 87 is dependent upon the rate of change of lateral displacement which is reflected in the movement of slider 123 it is evident that in extreme situations as when the craft is moving perpendicular to beam 14 when a maximum rate is developed that very little lateral displacement signal is utilized.

This utilization basically of the rate signal only from the localizer signal generator 23 at this time permits the turning of the craft parallel to the beam without opposition from the lateral displacement signal. After this initial turning, the rate of lateral displacement decreases and thus slider 123 is moved toward the center position permitting the application of the desired amount of lateral displacement signal along with the lateral rate signal so that the craft is more quickly aligned with the ground path 14 than would occur without modification of the lateral displacement signal by the lateral displacement rate.

In Figure 3, there is illustrated a modification of the apparatus which supplies control signals to the conductor 128 in Figure 2. In Figure 2, the conductor 128 is supplied with signal voltages from potentiometer 112 proportional to the rate of change of the control signal proportional to the lateral displacement of the aircraft from the beam 14 and also receives signals from potentiometer 117 as modified by the voltage divider 122 proportional to the lateral displacement of the aircraft from the beam 14, Figure 1. The modification in Figure 3 illustrates an alternative construction for providing the rate of displacement signal and also a variation in the structure for modifying the lateral displacement signal in accordance with the lateral displacement rate of the craft relative to beam 14.

As in Figure 2, Figure 3 illustrates the converter 137 which supplies control signals to amplifier 138 with the amplifier in turn controlling the motor 144 which drives the velocity signal generator 149, shafts 153, 152. The operation of shaft 152 is supplied to slider 119 of the rebalance potentiometer 118 to derive a follow-up signal from signal generator 117. The output of the velocity signal generator 149 is supplied to two voltage dividers 170, 171. The voltage from the voltage divider 171 is supplied through an isolation transformer 173 to the input circuit of amplifier 138. Thus the amplifier 138 is controlled from the output of the converter, the rebalance signal from generator 117 and the voltage from the velocity signal generator through the isolation transformer 173.

Instead of deriving the lateral displacement rate signal from a rate gyroscope as in Figure 2, the arrangement in Figure 3 derives a lateral displacement rate signal from the voltage divider 170. Since the rate of rotation of motor 144 is proportional to the rate of change of the lateral displacement signal, the voltage generated by velocity signal generator 149 is also proportional to the rate of change of lateral displacement. The voltage dividing potentiometer 170 energized from velocity signal generator 149 therefore supplies a voltage proportional to the lateral displacement rate of the craft relative to beam 14.

In Figure 3, the lateral displacement signal is supplied from a separate signal generator 174 rather than from the same signal generator 117, Figure 2, which supplies both a rebalance signal to the amplifier 138 and also supplies an input connected to conductor 128. The signal generator 174 comprises the autopilot control potentiometer 175 having a slider 176 and resistor 177 connected across a secondary winding 178 of the transformer. A voltage dividing potentiometer 180 has its resistor 182 connected across slider 176 and a center tap of secondary winding 178. The voltage divider 180 includes a slider 181 connected to conductor 128. The center tap of secondary winding 178 is connected by conductor 183 to the voltage dividing potentiometer 170 so that the conductor 128 is energized from voltage divider 170 and signal generator 174. The slider 181 has an operating means 185 extending therefrom. The actuating means 185 is positioned by a conventional centrifugal governor 186. The governor includes a collar 187 rotatable on shaft 188. The collar 187 includes an outer member 189 for operating the actuating means 185. The member 189 may consist of a portion affixed to collar 187 and having a peripheral channel which is engaged by one end of actuating means 185 so that upon increase in speed of motor driven shaft 188 and consequent outward movement of governor weights 190, 191 the collar 187 is moved downward in the figure carrying with it the actuating means 185. This movement of the actuating means 185 will move the slider 181 along voltage dividing potentiometer resistor 182 toward the center tap of secondary winding 178 to reduce the voltage from signal generator 174 applied to conductor 128. It will thus be apparent that the portion of the voltage selected from the craft lateral displacement potentiometer 174 varies with the rate of change of lateral displacement of the craft relative to beam 14.

It will now be understood from the above description that the invention contemplates the automatic alignment of the aircraft with a ground path defined by radio signals in a method of operation in which the craft is controlled in heading in accordance with the rate of change of lateral displacement of the craft relative to the ground path and the lateral displacement of the craft relative to the ground path or proportional to the position of the craft relative to the ground path which displacement control is modified in accordance with the rate of change of lateral displacement of the craft relative to the ground path. Since various modifications may be made in the above described apparatus, I do not wish to limit my invention to the form thereof described but as limited by the annexed claims.

What is claimed is:

1. Apparatus for operating control surfaces of an aircraft for controlling the heading thereof comprising: an automatic pilot for operating said control surfaces; means for providing a signal proportional to the lateral displacement of the craft from a path defined by radio beams; an amplifier responsive to said lateral displacement signal; a control motor operated by said amplifier; a feedback voltage generator driven by said motor connected to said amplifier so that the displacement of said motor is proportional to the lateral displacement signal; means driven by said control motor to provide a voltage signal proportional to the rate of change in lateral displacement of said craft; further means driven by said control motor driven means for modifying the voltage of said feedback generator; and means for connecting the modified voltage and the lateral displacement rate voltage to said automatic pilot for reducing the lateral displacement of said aircraft from the defined path.

2. Apparatus for controlling an automatic pilot for an aircraft to align the flight path thereof with a desired ground path, said apparatus comprising: an amplifier having a balanceable control signal circuit adapted to receive a signal proportional to the lateral displacement of the aircraft from the desired ground path defined by radio signals; a control motor operated by said amplifier at a speed proportional to the circuit unbalanced signal; a feedback signal generator operated by said control motor and connected to the amplifier control circuit to proportion the displacement of the motor to the magnitude of the applied signal; a gyroscope precessed in accordance with the rate of operation of the control motor; a second voltage generator operated by precession of said gyroscope to provide a signal proportional to the rate of change of lateral displacement of the aircraft; further means operated by said gyroscope on precession thereof to modify the signal from the feedback generator; and means for combining the modified signal with the signal from the second generator and connected to said automatic pilot.

3. In control apparatus for automatically directing an aircraft along a ground path defined by radio beams in combination: automatic pilot means for controlling the heading of said craft; radio receiving means for deriving a signal having a magnitude proportional to the lateral displacement of the craft from the ground path; further means connected to the receiving means and controlled by said radio receiving means signal for providing an alternating voltage proportional to the lateral displacement of the craft from the ground path; operable means connected to the further means for providing a second alternating voltage proportional to the rate of change of craft lateral displacement; ratio means connected to the further means for modifying the first alternating voltage in accordance with the rate of change of lateral displacement of the craft; and connecting means for supplying the modified alternating voltage and the craft lateral displacement rate voltage to said automatic pilot to correct the heading of the craft for departures thereof from the beam.

4. Control apparatus for automatically directing an aircraft along a predetermined ground path defined by radio beams, said apparatus comprising: automatic flight control means for controlling the heading of said aircraft; radio receiver means on said aircraft for deriving a signal having a magnitude proportional to the positional displacement of said aircraft from the ground path; balanceable amplifier means; electric motor means responsive to said amplifier; follow-up means operated by said motor; means for controlling said amplifier means from said signal and follow-up means; further signal providing means operated in proportion to the extent of motor displacement to provide a craft lateral position displacement signal; means driven by the electric motor means for deriving a signal proportional to the rate of change of lateral displacement of the craft; means operated by the electric motor means for decreasing the lateral displacement signal in accordance with the rate of change of lateral displacement; and means for supplying the modified displacement signal and the craft lateral displacement rate signal to said automatic flight control apparatus to maintain said aircraft along the predetermined ground path.

5. Apparatus for controlling the flight of an aircraft to control the heading thereof comprising: an automatic pilot for operating control surfaces of the craft to change its position about its vertical axis; means for supplying a signal proportional to the lateral displacement of the craft from a ground path defined by radio signals; means including a control motor responsive to said signals; a follow-up motor displacement signal generator driven by said control motor and opposing the lateral displacement signal to proportion the motor displacement to the craft lateral displacement; control motor driven means for supplying a signal proportional to the rate of change of lateral displacement of the aircraft relative to the path; means for connecting the follow-up and displacement signals in series; further means driven by the control motor driven means for modifying the follow-up signal; and means for supplying the modified follow-up signal and the craft lateral rate signal to the automatic pilot to correct the lateral displacement of the craft from the ground path.

6. Control apparatus for automatically steering an aircraft along a ground path defined by radio beams, said apparatus comprising: an automatic pilot for stabilizing the aircraft about its vertical axis; radio wave responsive receiver means for supplying a signal proportional to the lateral displacement of the aircraft from the ground path; a control motor; a follow-up system responsive to the signal for operating the control motor means for supplying an alternating voltage signal proportional to the aircraft lateral displacement and operated by said control motor; voltage dividing means operated by the control motor for modifying only the magnitude but not the phase of the lateral displacement alternating voltage in accordance with the rate of operation of the control motor; and connecting means for supplying said modified lateral displacement voltage signal to said automatic pilot to reduce the lateral displacement of the craft from the ground path.

7. In an apparatus for automatically steering dirigible craft along a ground path defined by radio signals, in combination: a phase sensitive amplifier responsive to alternating voltage signals proportional to the lateral displacement of the craft from the ground path; an induction motor having two windings one connected to the output of the amplifier; a follow-up alternating voltage generator driven by said motor and connected in opposition to said lateral displacement signal whereby the extent of operation of the motor is proportional to the lateral displacement of the craft and the rate of operation of the motor is proportional to the rate of change of lateral displacement; a velocity gyroscope operated by said motor and providing a third velocity voltage signal proportional to the rate of change of lateral displacement; further means positioned by the gyroscope on precession thereof for modifying the follow-up voltage; and means for combining said modified follow-up voltage and said velocity signal voltage; an automatic pilot for steering the craft, and means for applying the combined velocity and modified displacement voltages to said automatic pilot.

8. Apparatus for automatically directing and aircraft along a predetermined ground path defined by radio signals, said apparatus comprising: balanceable control means for operating control surfaces of the aircraft for altering its heading; radio signal responsive receiver means for supplying an alternating voltage proportional to the lateral displacement of the craft from the ground path; further means responsive to said receiver means; a velocity type gyroscope operated by the further means and precessed thereby to provide a signal proportional to the rate of lateral displacement of the craft from the ground path; voltage dividing means for selecting a portion of the lateral displacement signal in accordance with the precession of the gyroscope; attitude responsive means providing a bank attitude signal and means for connecting the selected portion of the lateral displacement signal, the bank attitude signal and the lateral displacement rate signal to said balanceable control means.

9. Control apparatus for an aircraft having control surfaces for altering its position about its longitudinal axis, said apparatus comprising: balanceable control means for operating said control surfaces; means for providing a signal proportional to the lateral displacement of the aircraft from a ground path defined by radio signals; servo means positioned in accordance with the magnitude of the lateral displacement signal and providing an autopilot lateral displacement control signal; a velocity gyroscope precessed by said servo means and modifying the autopilot control signal; further means operated by precession of said gyroscope for providing a second lateral displacement velocity autopilot control signal; means for applying the velocity signal and the modified first autopilot signal to said balanceable control means, and further means for operating said control means in accordance with bank angle of said craft to proportion the bank angle to the modified lateral displacement and lateral displacement rate signals.

10. Control apparatus for automatically steering an aircraft along the ground path defined by radio signals, said apparatus comprising: balanceable control means for operating control surfaces of said craft to effect steering thereof, a heading detecting means for operating said control means to maintain a predetermined heading of the craft; a vertical gyroscope for operating said control means to maintain a desired lateral attitude of the craft; means for rendering the heading detecting means ineffective to operate said control means; radio beam responsive means for providing a control signal proportional to the lateral displacement of the craft from the ground path; rotatable means operated by the radio beam responsive means for modifying the lateral displacement signal in accordance with the lateral displacement rate of the craft; further means in said radio beam responsive means for additionally providing a signal proportional to the lateral displacement rate of the craft; means for connecting the modified lateral displacement signal and the lateral displacement rate signal to said balanceable control means to cause the craft to bank and turn with said vertical gyroscope limiting the bank of the craft to proportion the bank of the craft to the algebraic difference of the lateral rate signal and the modified lateral displacement signal.

11. Flight control apparatus for an aircraft for automatically steering the aircraft along a ground path defined by radio signals, said apparatus comprising: automatic pilot means having a directional gyroscope for stabilizing the heading of the aircraft and a vertical gyroscope for stabilizing the lateral attitude of the aircraft; means for providing a signal proportional to the lateral displacement of the craft from the ground path; a motor responsive to said lateral displacement signal and rotating an extent proportional to the lateral displacement signal; a velocity type gyroscope precessed by operation of the motor; a voltage generator positioned by said gyroscope to provide a velocity signal proportional to the lateral displacement rate of the aircraft relative to the path; and means for supplying the velocity signal to said automatic pilot to direct said aircraft to said ground path; and means for rendering the heading responsive gyroscope ineffective.

12. Flight control apparatus for an aircraft comprising: a radio range receiver for receiving radio defined course position signals; balanceable means including an electric motor responsive to the positional signals from the receiver; follow-up means including a potentiometer operated by said electric motor to supply a follow-up displacement signal to said balanceable means; additional means connected to said potentiometer and operated by the electric motor in accordance with the positional change rate of the craft relative to said course for deriving a modified follow-up displacement signal from said potentiometer; an automatic pilot for stabilizing the aircraft about its turn axis; and connecting means for supplying the modified follow-up signal to said automatic pilot for controlling the directional flight of the aircraft along the course determined by said radio signals.

13. Flight control apparatus comprising: an electric motor means; signal input circuit means therefor responsive to a received input control signal which is proportional to the lateral displacement of the aircraft from a predetermined course line; follow-up means operated by said motor means operative to supply a follow-up displacement signal to the signal input circuit means and in opposition to said input control signals; gain control means connected to the follow-up means and operated in accordance with the displacement rate of said motor means to provide a modified displacement signal; servo means for operating the control surfaces of said craft; and means for supplying the modified signal to said servo means for altering the position of said craft.

14. In an apparatus for use in controlling the flight of an aircraft along a radio course: generator means for providing a control signal variable solely in magnitude with the displacement of the aircraft from a chosen course; gain changing means connected to the generator for selecting a portion of said displacement control signal in accordance with the rate of approach of said craft to said course; attitude means for generating an attitude signal in accordance with the attitude of the craft about its roll axis; and means responsive to said selected portion of said control signal and to said attitude signal.

15. The apparatus of claim 14, and comprising further means for generating a signal in accordance with the rate of approach of said craft to said course; and means for concurrently controlling said responsive means from said further means signal.

References Cited in the file of this patent

UNITED STATES PATENTS

| | | |
|---|---|---|
| 2,423,337 | Moseley | July 1, 1947 |
| 2,463,362 | Henri-Georges Doll | Mar. 1, 1949 |
| 2,576,135 | Moseley | Nov. 27, 1951 |
| 2,670,454 | Wilson | Feb. 23, 1954 |